Aug. 14, 1928.

L. A. FLEURY 1,680,532

AIR MOISTENER

Filed March 28, 1927

Inventor
LOUIS A. FLEURY,

By James A. Walsh,

Attorney

Patented Aug. 14, 1928.

1,680,532

UNITED STATES PATENT OFFICE.

LOUIS A. FLEURY, OF INDIANAPOLIS, INDIANA.

AIR MOISTENER.

Application filed March 28, 1927. Serial No. 178,951.

The object of my invention is to provide an air moistener which will readily control its water supply in a very simple manner so that as the quantity in its container diminishes by evaporation the supply will be replenished to a predetermined amount, and then discontinued, by mechanisms which automatically operate to open and close the source of water supply and which operations are repeated whenever the amount of water required is appreciably varied.

Figure 1:
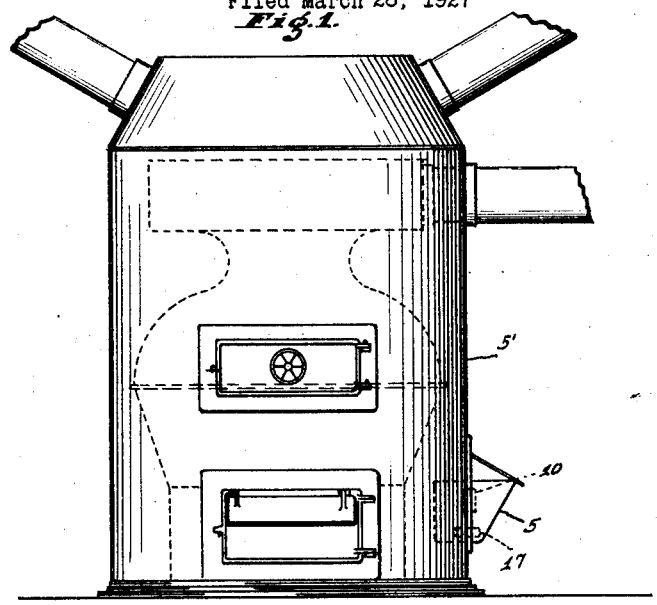
Figure 2:
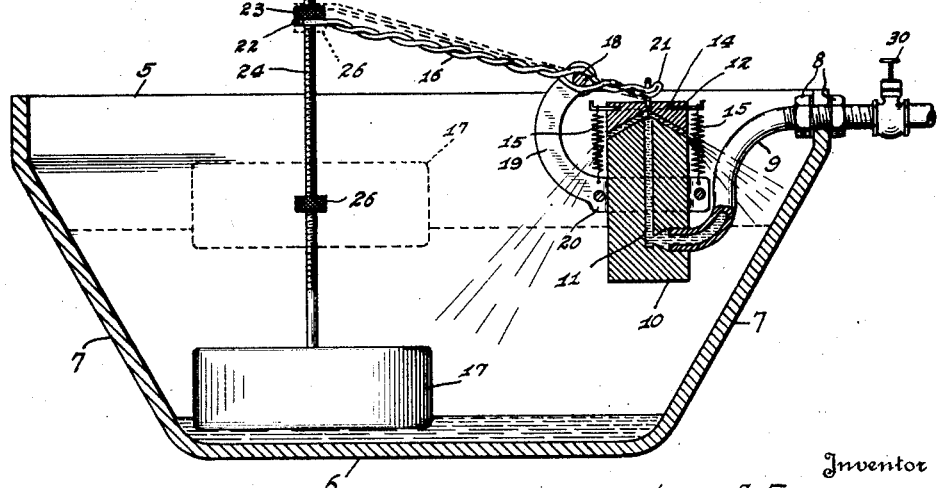

In the accompanying drawing, forming part hereof, in Figure 1 I have illustrated my improvement as applied to heating furnaces for dwellings, but it will be understood that it is applicable for humidifying air under numerous conditions; and Fig. 2 is a transverse sectional view of my improved air moistener showing the operative mechanisms embodied in the same.

In said drawings the portions marked 5 indicate the water container which preferably comprises a bottom, 6, and upwardly inclined walls, 7, thus constituting a flaring vessel so that the water therein will have an increased surface and therefore a comparatively wide area subject to evaporation. As illustrated in Fig. 1, the air moistener 5 may be inserted and sustained within the shell, 5', surrounding a furnace, or in any practical manner, and is constructed and arranged as follows. A water supply pipe, 9, is connected to a wall 7 of the receptacle by suitable lock-nuts, 8, or otherwise, and which pipe may lead from a city water main, storage tank or other source of supply, said pipe being connected to a valve body 10, and discharging into the channel, 11, thereof. Water flowing through the supply pipe passes through said channel 11, and its pressure causes a valve-cap, 12, to raise from the valve body to such extent that a passageway or outlet, 14, is effected through which water is discharged from the supply pipe into the receptacle 5, the actuation of said valve-cap being to some extent controlled by tension springs, 15, and so timed that when a predetermined quantity of water is discharged into the receptacle, as indicated by the water level lines, the lever and springs will maintain said valve-cap seated against the valve body so that the water supply will be cut off. The movements of the valve-cap are controlled by a lever, 16, and a float, 17, the lever being fulcrumed, as at 18, upon a support, 19, which may be secured to the valve body by a clamp, 20, or otherwise so connected to the receptacle or valve body as to support said lever, the terminal, 21, of which engages the valve-cap. This lever 16 may be of any appropriate construction and arrangement, that shown being a twisted wire terminating at one end in a loop, 22, or other suitable device adapted to contact an adjustable nut, 23, threaded upon a stem, 24, to which the float 17 is connected, and which stem is also provided with a lower adjusting nut, 26, to limit the range of movement of the float 17 in relation to said lever 16. As water flows into the receptacle 5 through the discharge outlet in the valve the float 17 follows the rising surface thereof until the water reaches a predetermined level, when said float and stem will occupy the position indicated by dotted lines in Fig. 2, the stem 24 and adjustable nut 23 ascending to the position indicated by dotted lines, while the lower adjusting nut 26 has traveled upwardly with said stem 24 to contact the under side of the loop 22 or other device. At this stage of the operation the water level is at its predetermined height, and, as the surface thereof evaporates through the influence of the surrounding heat, constant replenishment of the water is effected through the action of float 17, which follows the receding body of water until it is so lowered that the upper adjusting nut 23 contacts with the loop 22 of lever 16 and moves the same downwardly, which movement causes the opposite or terminal end 21 of the lever, through the fulcrum 18, to raise, at the same time moving the valve-cap 12 slightly from valve body 10 and thus opening the discharge outlet 14 so that a renewed water supply from pipe 9 flows through channel 11 and said discharge outlet into receptacle 5, and, as the float raises with the body of water being thus replenished, a reverse movement of lever 16 is effected by contact of the lower adjusting nut 26 with the under side of loop 22, which lowers the end 21 of lever 16 to engage the valve-cap 12 with the valve body 10 to shut off the water supply, this movement being assisted by the downwardly pulling springs 15.

The pressure of the water, it will be understood, may be regulated by a check-valve, as 30, or otherwise, so that the flow will be readily controlled by the synchronous action of the float 17, lever 16 and valve-cap 12;

and it will thus be seen that I provide an air moistener embodying mechanisms which will be highly sensitive and readily responsive to the variations in the water supply caused by evaporation to regulate such supply and at all times automatically repeat its operations and control the supply without the attention required for replenishing air moisteners with which I am aware. And while I have chosen to illustrate the form of valve shown in Fig. 2, I desire it to be understood that I may employ any appropriate type of valve for controlling the water supply; and, also, that my improved air moistener may be included in furnace constructions as manufactured, or may be installed in connection with furnaces already in use.

I claim as my invention:

1. In an air moistener, a fluid containing receptacle, a float therein, a stem connected to the float, a lever slidably connected to the stem, means on the stem to actuate the lever and to limit the range of movement of the float relative to the lever, a valve body, means for opening and closing the passage through the valve body, means connecting the lever to said opening and closing means, and means for conveying fluid to the valve body to be discharged into said receptacle.

2. An air moistener comprising a fluid receptacle, means for supplying fluid to the receptacle, a valve body through which the fluid is adapted to pass, means for opening and closing the passage through the valve body, a lever connected to said opening and closing means, means upon which the lever is fulcrumed, a stem to which the lever is slidably connected, adjustable means on the stem adapted when moved by the stem to engage and move the lever, and a float connected to the stem for actuating the lever to operate said opening and closing means as the fluid in the receptacle is diminished and replenished.

In testimony whereof I affix my signature.

LOUIS A. FLEURY.